US011299095B2

(12) United States Patent
Clarke (10) Patent No.: US 11,299,095 B2
(45) Date of Patent: Apr. 12, 2022

(54) APPARATUS FOR SECURING A SIDE MIRROR TO A VEHICLE

(71) Applicant: Wayne Gary Clarke, Spring, TX (US)

(72) Inventor: Wayne Gary Clarke, Spring, TX (US)

(*) Notice: Subject to any disclaimer, the term of this patent is extended or adjusted under 35 U.S.C. 154(b) by 0 days.

(21) Appl. No.: 16/990,963

(22) Filed: Aug. 11, 2020

(65) Prior Publication Data
US 2022/0048433 A1 Feb. 17, 2022

(51) Int. Cl.
*B60R 1/078* (2006.01)
*F16B 37/00* (2006.01)
*F16B 11/00* (2006.01)

(52) U.S. Cl.
CPC .............. *B60R 1/078* (2013.01); *F16B 37/00* (2013.01); *F16B 11/006* (2013.01)

(58) Field of Classification Search
CPC . B60R 1/078; B60R 1/06; F16B 37/00; F16B 11/006
USPC .... 248/544, 466, 467, 475.1, 476, 479, 481, 248/482, 485
See application file for complete search history.

(56) References Cited

U.S. PATENT DOCUMENTS

| | | | | |
|---|---|---|---|---|
| 2,109,142 A * | 2/1938 | Rosen | ........................ | B60R 1/06 248/475.1 |
| 4,253,633 A * | 3/1981 | Takegawa | ................. | B60R 1/06 248/205.1 |
| 4,368,868 A * | 1/1983 | Urban | .................... | B60R 1/0605 248/475.1 |
| 4,500,063 A * | 2/1985 | Schmidt | ..................... | B60R 1/06 248/314 |
| 4,818,088 A * | 4/1989 | Sacknoff | ..................... | B60J 1/04 248/479 |
| 4,991,814 A * | 2/1991 | Schmidt | ................ | B60R 1/0605 248/479 |
| 5,069,410 A * | 12/1991 | McKee | ................. | B60R 1/0605 248/475.1 |
| 5,516,073 A * | 5/1996 | McMahan | ................. | B60R 1/06 248/289.11 |
| 6,109,586 A * | 8/2000 | Hoek | ...................... | B60R 1/076 248/476 |
| 6,411,447 B1 * | 6/2002 | Hilbert | ................. | G02B 7/1825 359/819 |
| 7,543,788 B2 * | 6/2009 | Herb | ......................... | F16L 3/16 248/228.1 |
| 8,056,879 B2 * | 11/2011 | Chang | .................. | G02B 7/1825 248/478 |

(Continued)

*Primary Examiner* — Eret C McNichols
*Assistant Examiner* — Michael McDuffie
(74) *Attorney, Agent, or Firm* — Madan Law PLLC; Leela Madan; Jeffrey Streets (57) ABSTRACT

An apparatus for securing a side mirror to a vehicle includes a solid body having base and top surfaces. The base surface has a contour complementary to that of an exterior surface of the vehicle. First and second holes are formed through the solid body from the base surface to the top surface. Positioning the base surface face-to-face with the exterior surface of the vehicle aligns the first hole with a first threaded hole in the vehicle and aligns the second hole with a second threaded hole in the vehicle. Each of the first and second holes has a counterbore that opens to the top surface of the rigid body. A third hole in the solid body opens to the top surface between the counterbores of the first and second holes, wherein the third hole is threaded to receive a threaded screw that attaches a mirror.

20 Claims, 5 Drawing Sheets

(56) References Cited

U.S. PATENT DOCUMENTS

| | | | |
|---|---|---|---|
| 8,807,510 B2* | 8/2014 | Sugisaka | B60R 1/06 |
| | | | 248/475.1 |
| 9,180,816 B2* | 11/2015 | Dutton | B62D 65/024 |
| 9,221,398 B1* | 12/2015 | Englander | B60R 1/06 |
| 9,751,466 B2* | 9/2017 | Huang | B60R 1/06 |
| 10,502,361 B2* | 12/2019 | Braun | B60R 1/06 |
| 11,013,350 B2* | 5/2021 | Deshmukh | A47G 1/16 |
| 2004/0218294 A1* | 11/2004 | Chen | B60R 1/078 |
| | | | 359/871 |
| 2016/0368419 A1* | 12/2016 | Toth | B60R 1/078 |
| 2019/0283674 A1* | 9/2019 | Bennett | B60R 1/078 |
| 2019/0299844 A1* | 10/2019 | Yoshioka | B60R 1/06 |
| 2020/0079290 A1* | 3/2020 | Portuallo | B60R 1/12 |

* cited by examiner

APPARATUS FOR SECURING A SIDE MIRROR TO A VEHICLE

BACKGROUND

The present disclosure relates to an apparatus for securing a side mirror to a vehicle.

BACKGROUND OF THE RELATED ART

Vehicles have side mirrors to enable a person seated in the vehicle to face forward yet see objects and activity along the sides of the vehicle. The angle of the side mirror is generally adjustable according to the person's height, the vehicle's seat position, and the person's desired viewing area. The ability to see objects and activity along the sides of the vehicle improves the safety of the person driving the vehicle. Accordingly, side mirrors are standard equipment on most vehicles.

The side mirrors are often secured to the doors of the vehicle, including the driver side door for seeing along the driver side of the vehicle and the passenger side door for seeing along the passenger side of the vehicle. However, some vehicles have a feature where the doors may be removed. Unfortunately, removal of the doors also removes the side mirrors, thereby reducing the safety and drivability of the vehicle.

BRIEF SUMMARY

One embodiment provides an apparatus for securing a side mirror to a vehicle. The apparatus may include a solid body having a base surface and a top surface, wherein the base surface has a contour that is complementary to a contour of an exterior surface of the vehicle. The apparatus may further include first and second holes through the solid body from the base surface to the top surface. Positioning the base surface face-to-face with the exterior surface of the vehicle enables a central axis of the first hole to be aligned with a central axis of a first threaded hole in the vehicle and enables a central axis of the second hole to be aligned with a central axis of a second threaded hole in the vehicle, and wherein each of the first and second holes has a counterbore that opens to the top surface of the rigid body. Still further, the apparatus may include a third hole that opens to the top surface in an area between the counterbores of the first and second holes, wherein the third hole is threaded to receive a threaded screw that attaches a mirror.

Some embodiments provide a kit for securing a side mirror to a vehicle frame. The kit may include a solid body according any of the disclosed embodiments. For example, the solid body may have a base surface, a top surface, first and second holes through the solid body from the base surface to the top surface, and a third hole that opens to the top surface. The base surface may have a contour that is complementary to a contour of an exterior surface of the vehicle. Positioning the base surface face-to-face with the exterior surface of the vehicle enables a central axis of the first hole to be aligned with a central axis of a first threaded hole in the vehicle and enables a central axis of the second hole to be aligned with a central axis of a second threaded hole in the vehicle. Each of the first and second holes may also have a counterbore that opens to the top surface of the rigid body. Furthermore, the third hole may open to the top surface in an area between the counterbores of the first and second holes, and the third hole may be threaded to receive a threaded screw that attaches a mirror. The kit may further include first and second screws each having a threaded shaft and a head, wherein the threaded shaft of either of the first and second screws is insertable into either of the first and second holes until the head of the screw is received within the counterbore. The first and second screws are sized for threadably securing to the first and second threaded holes in the vehicle.

DETAILED DESCRIPTION

One embodiment provides an apparatus for securing a side mirror to a vehicle. The apparatus may include a solid body having a base surface and a top surface, wherein the base surface has a contour that is complementary to a contour of an exterior surface of the vehicle. The apparatus may further include first and second holes through the solid body from the base surface to the top surface. Positioning the base surface face-to-face with the exterior surface of the vehicle enables a central axis of the first hole to be aligned with a central axis of a first threaded hole in the vehicle and enables a central axis of the second hole to be aligned with a central axis of a second threaded hole in the vehicle, and wherein each of the first and second holes has a counterbore that opens to the top surface of the rigid body. Still further, the apparatus may include a third hole that opens to the top surface in an area between the counterbores of the first and second holes, wherein the third hole is threaded to receive a threaded screw that attaches a mirror.

The solid body may be made with any weather resistance and rigid material. In one option, the solid body may be a block of metal that has been machined, die cast and/or printed on a three-dimensional printer. Similarly, the solid body may be made of a rigid plastic that has been injection molded, machined and/or printed on a three-dimensional printer. When the solid body is made with metal and/or plastic, the threads in the third hole may be provided by machining or forming about a threaded insert. Furthermore, the solid body may or may not have internal voids for the purpose of reducing the mass of the solid body without compromising the rigidity of the solid body.

The base surface is to be directed face-to-face with an exterior surface of the vehicle, such as the exterior surface of a vehicle front pillar. The top surface of the solid body is opposite of the base surface and is generally directed away from the exterior surface of the vehicle. While the base surface may be contoured in a manner that is complementary to the contour of the exterior surface of the vehicle at a location where the solid body is to be secured, the top surface may be contoured in various manners. For example, the top surface may be contoured to avoid sharp points, avoid collection of water or dirt, and/or to visually coordinate with features of the vehicle. Furthermore, size and shape of the solid body, including the contour of the top surface, should be selected to avoid interfering with the operation of the vehicle door, including opening and closing of the door as well as removal and installation of the door from its hinges. The solid body may be securely and removably attachable to the vehicle yet may remain on attached to the vehicle while avoiding interference with opening, closing, removal and installation of the door. The contour of the base surface may be flat where the exterior surface of the vehicle is flat in the location where the solid body is to be secured. However, the base surface may also have a contour that is convex, concave, irregular or complex.

The first and second holes extend through the solid body from the base surface to the top surface. The central axis of the first and second holes may be parallel, but this is not a requirement. Rather, the central axis of the first hole should align with a central axis of the first threaded hole in the vehicle and the central axis of the second hole should aligned with a central axis of the second threaded hole in the vehicle. Accordingly, the solid body may be secured to the vehicle with first and second screws that extend through the first and second holes, respectively. The first and second holes preferably each have a counterbore that opens to the top surface and extends below the top surface of the solid body a distance that allows the head of the first and second screws to be flush or recessed below the top surface. Most preferably, the counterbore extends sufficiently below the tope surface to receive the screw head and a lock washer and still not extend above the top surface. The counterbore may have a diameter that is only slightly larger than the diameter of the screw head and any lock washer. The first and second holes may have a diameter that is slightly larger than the diameter of the screw threads, yet smaller that the diameter of the screw head and any lock washer.

The third hole opens to the top surface in an area between the counterbores of the first and second holes, and the third hole is threaded to receive a threaded screw that attaches a mirror. In some embodiments, the third hole is the only hole in the solid body that is threaded. The threads of the third hole may be selected for mating with a threaded end of a post or arm that extends from a mirror assembly. More specifically, the internal threads of the third hole may match the external threads of the post or arm. Matching threads should have the same or compatible pitch, number of starts, and diameters. Most preferably, the internal threads of the third hole and the external threads of the post or arm will be standard threads according to a particular specification. For example, the screw threads may be formed according to a given size of the International Organization for Standards (ISO) or the Unified Thread Standard (UTS). Furthermore, the third hole may be a blind threaded hole that does not open to the base surface, or the third hole may extend completely through the solid body to open to both the base surface and the top surface.

In some embodiments, the solid body may have a first end, a second end, a first side and a second side. Optionally, the solid body may be symmetrical from side-to-side and/or symmetrical from end-to-end. The solid body may also have a side-to-side width that is less than a distance between the central axis of the first hole and the central axis of the second hole. In one non-limiting example, the solid body may have a total thickness between the base surface and the top surface that is less than or equal to 40 millimeters, and preferably less than or equal to 30 millimeters. However, the top surface may be contoured relative to the base surface such that the thickness of the solid body may be reduced across much of the top surface. This may be accomplished with a top surface that tapers downward from a central area toward the first and second ends. Such tapering may help avoid interference with operation of the door, reduce sharp corners, and reduce collection of water and dirt. In addition, the solid body may have beveled edge between the top surface and first and second sides of the solid body. The shape of the solid body, when viewed from the base or the top, may be rectangular or oval without limitation. In one option, the base surface has the shape of a rectangle with truncated corners.

Some embodiments provide a kit for securing a side mirror to a vehicle frame. The kit may include a solid body according any of the disclosed embodiments. For example, the solid body may have a base surface, a top surface, first and second holes through the solid body from the base surface to the top surface, and a third hole that opens to the top surface. The base surface may have a contour that is complementary to a contour of an exterior surface of the vehicle. Positioning the base surface face-to-face with the exterior surface of the vehicle enables a central axis of the first hole to be aligned with a central axis of a first threaded hole in the vehicle and enables a central axis of the second hole to be aligned with a central axis of a second threaded hole in the vehicle. Each of the first and second holes may also have a counterbore that opens to the top surface of the rigid body. Furthermore, the third hole may open to the top surface in an area between the counterbores of the first and second holes, and the third hole may be threaded to receive a threaded screw that attaches a mirror. The kit may further include first and second screws each having a threaded shaft and a head, wherein the threaded shaft of either of the first and second screws is insertable into either of the first and second holes until the head of the screw is received within the counterbore. The first and second screws are sized for threadably securing to the first and second threaded holes in the vehicle.

In some embodiments, the kit may further include a plug securable to the third hole for protecting the threads of the third hole in the absence of an attached mirror. For example, the plug may have a head that completely covers the third hole to block dirt and water from entering into the third hole when the third hole is not securing a mirror. Optionally, the plug may be a threaded screw plug that is threadably securable with the threads of the third hole. Furthermore, the plug may be plastic to form a seal with the threads and/or the top surface of the solid body.

In some embodiments, the kit may further include a compressible pad that is shaped to cover the base surface. The compressible pad may be made from various materials, such as a latex foam rubber, neoprene, silicone rubber, polyurethane foam, polyethylene foam, or felt. The compressible pad may have first and second holes positioned to be aligned with the first and second holes through the solid body when the compressible pad is positioned to cover the base surface. In one option, the compressible pad may have an adhesive layer and a disposable backing sheet covering the adhesive layer, where the disposable backing sheet is removable to facilitate adhering the compressible pad to the base surface. Accordingly, the compressible pad may prevent scratching of the exterior surface of the vehicle.

In some embodiments, the kit may further include a side mirror having a post, wherein the post has a distal end that is threaded for threadably connecting to the third hole. The post may include a lock nut that is tightened down against the top surface of the solid body after the threads on the end of the post have been screwed into the third hole. The lock nut may be useful for preventing the post from rotating during use and prevent the post from vibrating out of the third hole. A preferred side mirror may include a swivel joint coupled to the post for manually adjusting an angle between the side mirror and the post.

Some embodiments of the kit may further include a second unit of the solid body and a second set of the first and second screws for threadably securing the second unit of the solid body to a second pair of threaded holes in the vehicle. For example, the first and second pair of threaded holes in the vehicle may on opposing left and right sides of the vehicle, such as on an exterior surface of the front left and front right pillars of the vehicle. Optionally, the kit may further include a second plug, a second compressible pad, and/or a second mirror.

Figure 1A:
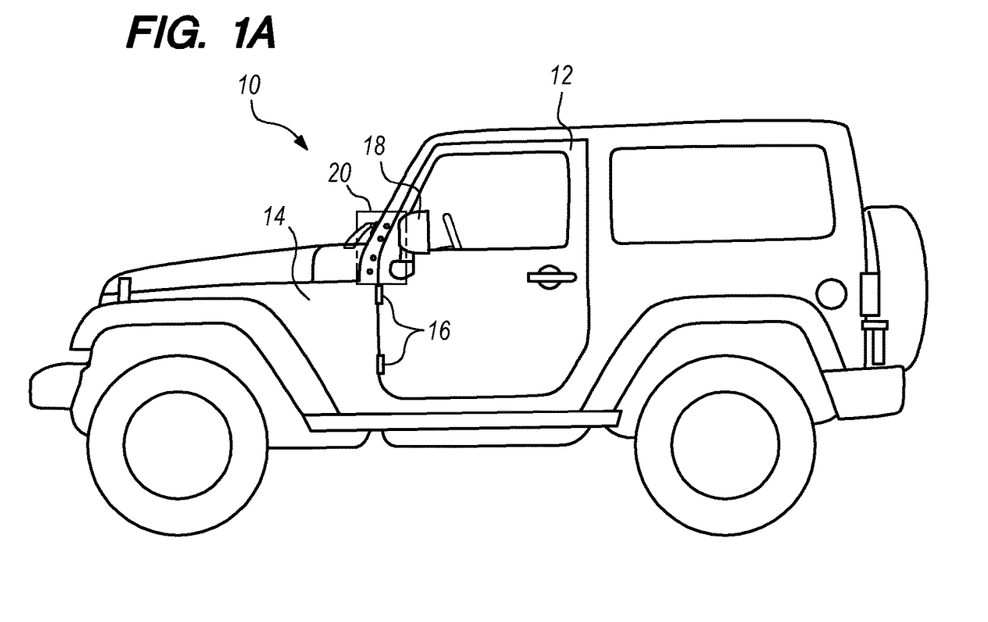
FIG. 1A is a driver's side view of a vehicle with the doors installed.

FIG. 1A is a driver's side view of a vehicle 10 with the doors (see driver's side door 12) installed. The driver's side door 12 is attached to the vehicle body 14 via hinges 16. Furthermore, the side door 12 also supports the side mirror 18. The circled area 20 is shown in greater detail below in reference to FIG. 2A and FIG. 2B.

Figure 1B:
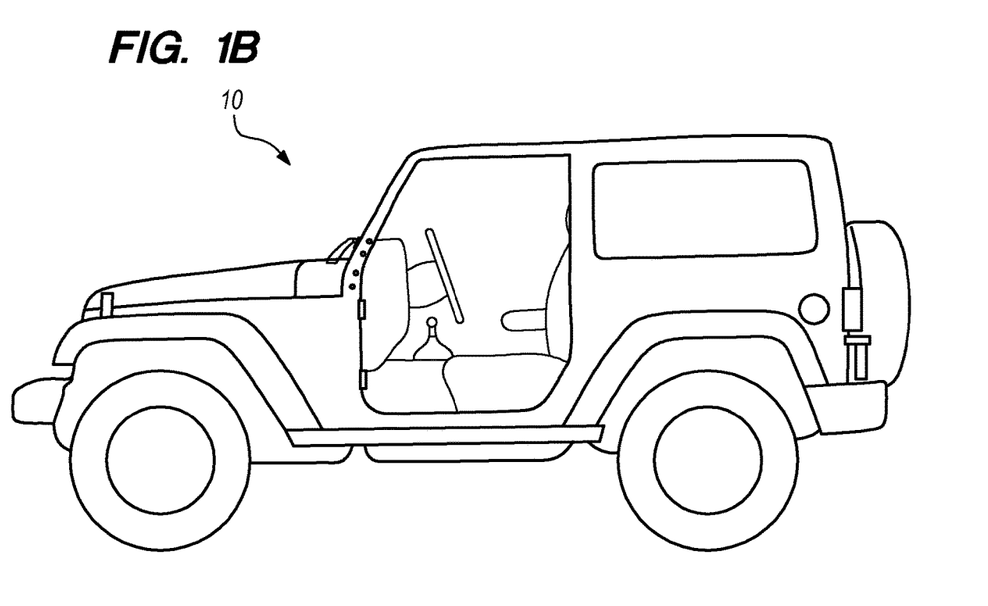
FIG. 1B is a driver's side view of the vehicle with the doors removed.

FIG. 1B is a driver's side view of the vehicle 10 with the doors (see driver's side door 12 of FIG. 1A) removed. This is a popular option for some vehicles, such as certain models of JEEP® brand vehicles. Unfortunately, removing the side door 12 also causes removal of the side mirror 18.

Figure 2A:
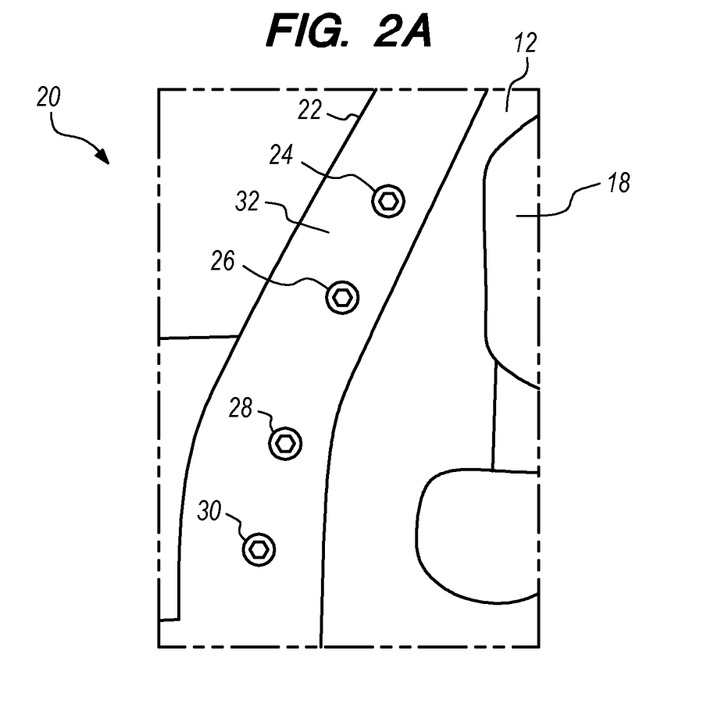
FIG. 2A is an enlarged side view of an exterior surface of the vehicle having multiple screws secured in threaded holes.

FIG. 2A is an enlarged side view of a front pillar 22 of the vehicle 10 having multiple screws 24, 26, 28, 30 secured in threaded holes that extend into the exterior surface 32 of the vehicle. The two threaded holes that engage the upper two screws 24, 26 may be used to secure a mirror attachment bracket in the form of the disclosed solid body. However, the screws 24, 26 may not long enough to attach the solid body, and may need to be replaced with longer screws.

Figure 2B:
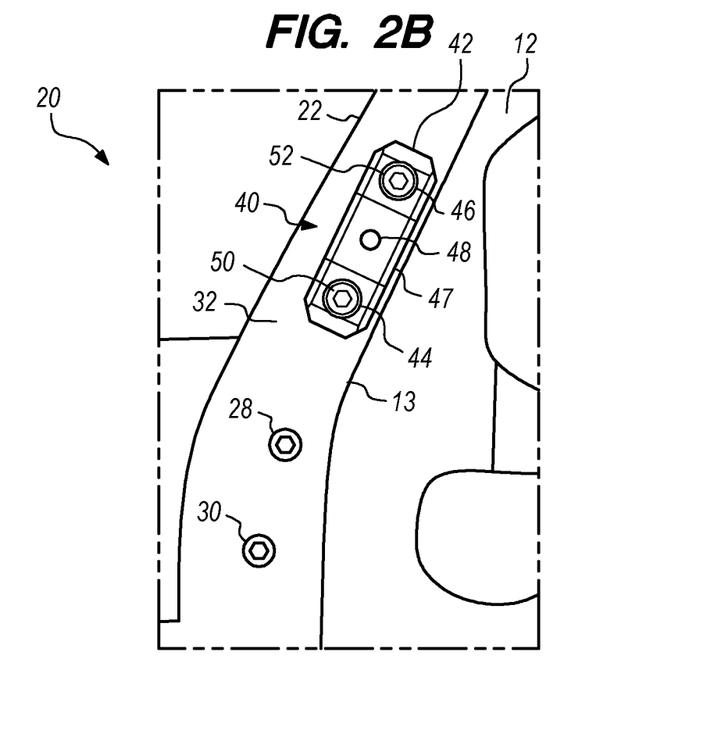
FIG. 2B is an enlarged side view of the exterior surface of the vehicle with a side mirror bracket coupled to the threaded holes in the front pillar.

FIG. 2B is an enlarged side view of the front pillar 22 of the vehicle with a side mirror bracket 40 coupled to the threaded holes (where screws 24, 26 were attached in FIG. 2A) in the front pillar. The mirror bracket 40 includes the solid body 42 having a first hole 44, a second hole 46, and a third hole 48. A first screw 50 is extended through the first hole 44 and threadably engaged with a first threaded hole in the vehicle and a second screw 52 is extended through the second hole 46 and threadably engaged with a first threaded hole in the vehicle. The solid body 42 has an edge 47 closest to the door 12 that is spaced apart form the edge 13 of the door 12 and has a size and shape that prevent the solid body 42 from interfering with the operation of the door 12. Accordingly, the mirror bracket 40 may be installed and kept in place whether or not the doors are open or closed, whether or not the doors are being installed or removed, and whether or not the side mirrors (not shown) are attached to the mirror bracket 40. The mirror bracket 40 may therefore be a permanent addition to the vehicle.

Figure 3A:
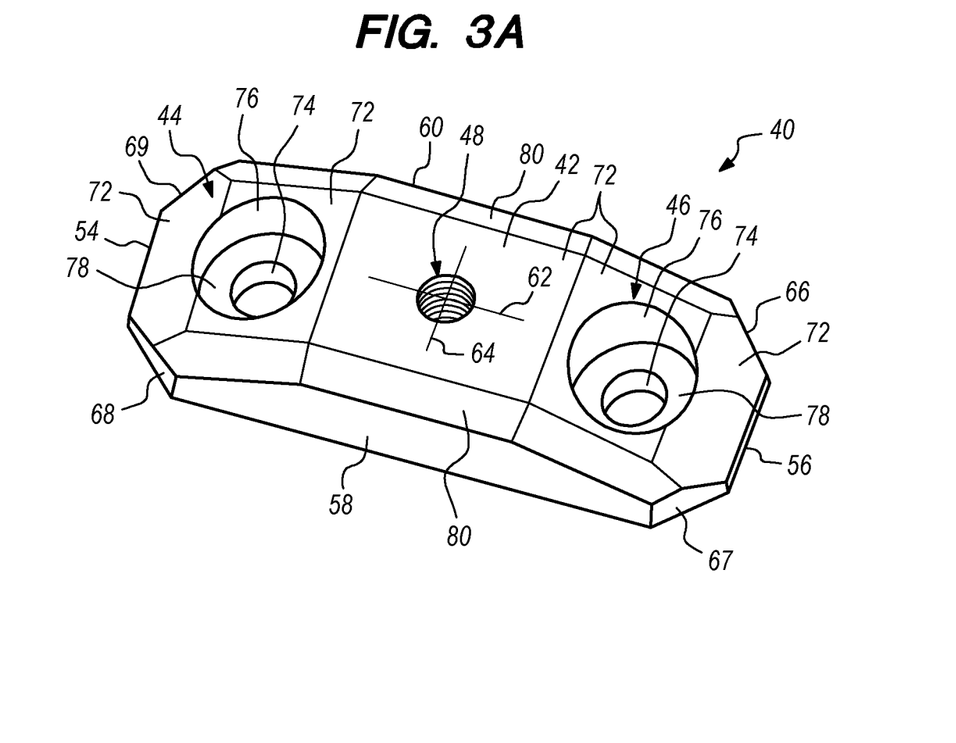
FIG. 3A is a perspective view of a solid body forming a side mirror bracket according to an embodiment.

FIG. 3A is a perspective view of the side mirror bracket 40 having the solid body 42 according to an embodiment. The solid body 42 also includes the first hole 44 near a first end 54 and the second hole 46 near a second end 56. Between the first hole 44 and the second hole 46 is a third hole 48 that is threaded. Each of the holes may be centered from one side 58 to the other side 60. As shown in the embodiments of FIG. 3A, the solid body may be symmetrical from side-to-side (i.e., relative to a centerline 62 midway between the sides 58, 60) and/or symmetrical from end-to-end (i.e., relative to a centerline 64 midway between the ends 54, 56).

The solid body 42 may have parallel sides 58, 60 and parallel ends 54, 56, such that the solid body 42 may be generally rectangular. The solid body 42 has a base surface (not shown; but see base surface 70 in FIG. 3B) and a top surface 72. While the base surface 70 and the top surface 72 may both be contoured, the base surface 70 include the primary downwardly-facing surface of the solid body 42 and the top surface includes the primary upwardly-facing surface of the solid body 42.

The generally rectangular solid body 42 may also have the corners 66, 67, 68, 69 between the sides 58, 60 and ends 54, 56 truncated. As shown, the truncated corners 66, 67, 68, 69 may be truncated at 45-degree angles and may be equal in length.

The first hole 44 and the second hole 46 may have the same dimensions and configuration. Each hole 44, 46 may have a lower portion 74 having a first diameter and an upper portion 76 having a second diameter that is greater than the first diameter. The lower portion 74 opens to the base surface 70 and the upper portion opens to the top surface 72. The upper portion 72 may be referred to as a counterbore that forms a shoulder 78. The third hole 48 extends into the solid body 42 from the top surface 72 and is internally threaded to receive a threaded screw that attaches a mirror. While the third hole 48 is open to the top surface 72, the third hole 48 may be a blind hole (i.e., does not extend through the base surface 70).

The solid body 42 may also have a beveled edge 80 between the top surface 72 and first and second sides 58, 60 of the solid body 42. The beveled edge 80 may have a flat surface, a slightly concave or cupped surface, or a slightly convex or bowed surface.

Figure 3B:
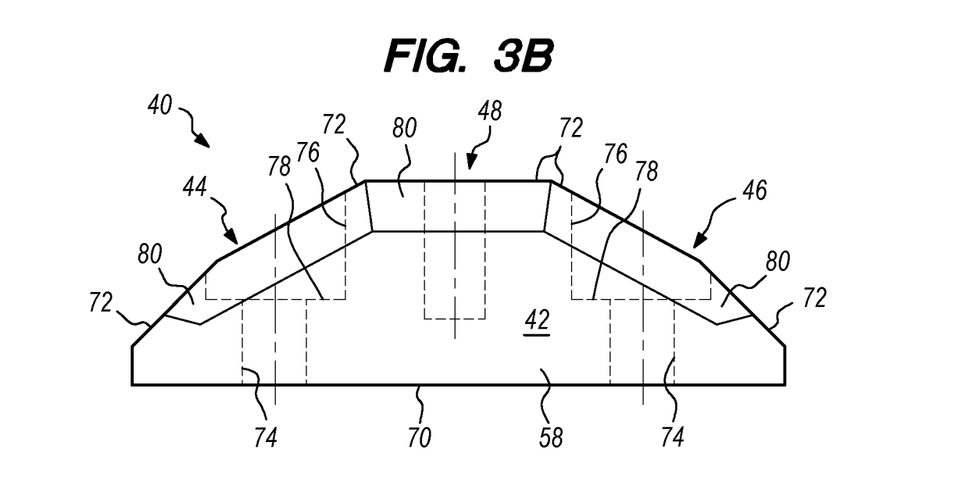
FIG. 3B is a side view of the solid body according to an embodiment.

FIG. 3B is a side view of the solid body 42 that forms the side mirror bracket 40. The side 58 extends from the base surface 70 upward to the top surface 72, which may include the beveled edge 80. The base surface 70 may have a contour that is complementary to a contour of an exterior surface of the vehicle. However, the base surface 70 is generally planar to be secured to a portion of the vehicle's exterior surface that is also generally planar. The contour of the top surface 72 may avoid sharp points, avoid concave portions that might collect water or dirt, and/or may visually coordinate with other features of the vehicle. Furthermore, size and shape of the solid body, including the contour of the top surface, may be selected to avoid interfering with the operation of the vehicle door, including opening and closing of the door as well as removal and installation of the door from its hinges.

The first hole 44, the second hole 46 and the third hole 48 are shown in dashed or phantom lines for perspective, but may not actually be seen from the side. Each hole 44, 46 may have a lower portion 74 having a first diameter and an upper portion 76 having a second diameter that is greater than the first diameter. The lower portion 74 opens to the base surface 70 and the upper portion opens to the top surface 72. The upper portion 72 may be referred to as a counterbore that forms a shoulder 78. The third hole 48 extends into the solid body 42 from the top surface 72 and is internally threaded to receive a threaded screw that attaches a mirror. While the third hole 48 is open to the top surface 72, the third hole 48 may be a blind hole (i.e., does not extend through the base surface 70). The third hole 48 may have a central axis that is parallel to a central axis of the first hole 44 and a central axis of the second hole 46, and the third hole 48 may be positioned half way between the central axis of the first hole 44 and the central axis of the second hole 46.

Figure 4:
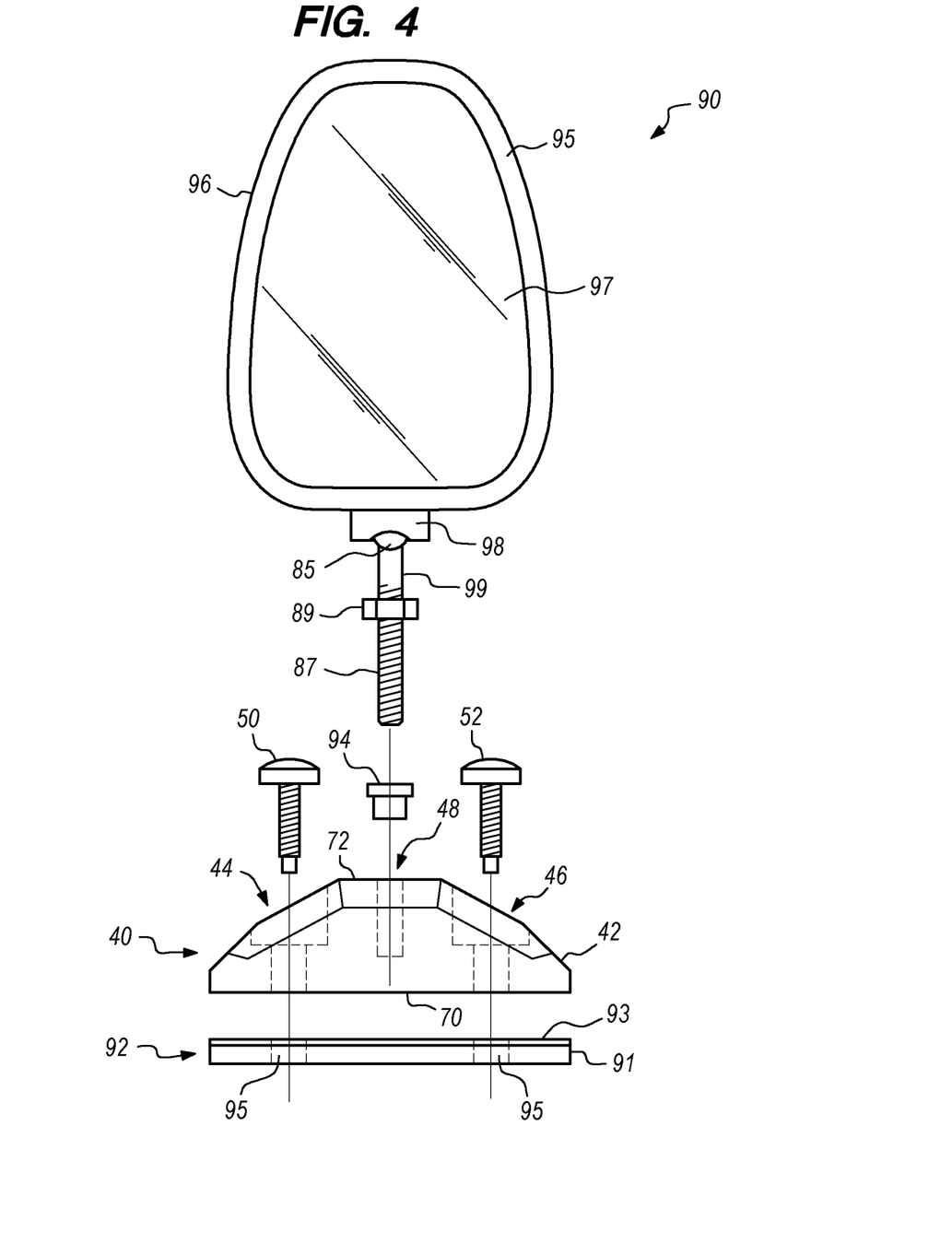
FIG. 4 is a diagram of a kit for securing a side mirror to a vehicle.

FIG. 4 is a diagram of a kit 90 for securing a side mirror to a vehicle. The kit 90 may include the side mirror bracket 40 and a pair of screws 50, 52 for securing the side mirror bracket 40 to the vehicle. Optionally, the kit 90 may further include any one or more components selected from a compressible pad 92, a screw hole plug 94, and a side mirror 96. Still further, the kit 90 may include a complete second set of the side mirror bracket 40, the pair of screws 50, 52, and any of the one or more components selected from a compressible pad 92, a screw hole plug 94, and a side mirror 96. Accordingly, a kit 90 might provide everything needed to install one side mirror or two side mirrors on a vehicle. Alternatively, the kit 90 may simply provide the side mirror bracket 40 and the pair of screws 50, 52, leaving the user to obtain the side mirror and any other desired components from other sources.

In the embodiment of FIG. 4, the compressible pad 92 may have a compressible felt layer 92 and a disposable backing sheet 93 covering the adhesive layer therebetween (not shown), where the disposable backing sheet 93 is easily removable to facilitate adhering the compressible pad to the base surface 70. The compressible pad 92 may also have pre-formed holes 95 that align with the first and second holes 44, 46, respectively, to facilitate passage of the screws 50, 52 therethrough.

The screw hole plug 94 may be secured in the third hole 48, either with a friction fit or a threaded connection. The screw hole plug 94 is used only when the side mirror 96 is not threadably secured to the third hole 48. The screw hole plug 94 may be beneficial for keeping water and/or dirt from collecting in the third hole 48 and causing damage to the threads.

The side mirror 96 has a frame 95 around the reflective mirror 97. The frame 95 forms a socket 98 of a ball joint or swivel. The side mirror 96 further includes a post or arm 99 that secures a ball 85 at a first end and may have screw threads 87 formed along the post 99 near a second end. Accordingly, the ball 85 may be manually rotated to a desired angle within the socket 98 and the screw threads 87 may be threadably secured into the third hole 48. A lock nut 89 may be received on the screw threads 87 prior to threadably securing into the third hole 48, and subsequently tightened down against the top surface 72 to avoid undesired rotation of the mirror 96 or undesired backing out of the screw threads 87 from the third hole 48.

Figure 5A:
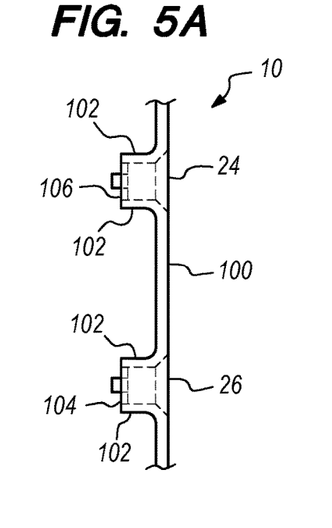
FIG. 5A is a side view of two threaded holes in a vehicle.

FIG. 5A is a side view of an exterior surface 100 of the vehicle 10 (see FIGS. 1A and 1B). The two screws 24, 26 have their heads exposed and accessible along the exterior surface 100 consistent with FIG. 2A. The exterior surface 100 is connected to an internally threaded cylindrical wall 102 that extends inward from the exterior surface 100 to form first and second threaded holes 104, 106.

Figure 5B:
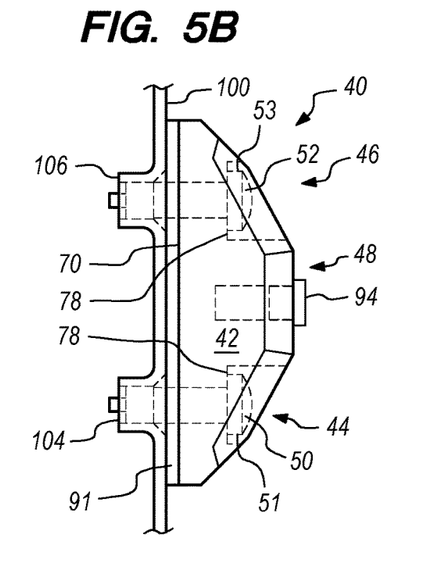
FIG. 5B is a side view of a side mirror bracket secured to the vehicle making use of the two threaded holes in the vehicle.

FIG. 5B is a side view of the side mirror bracket 40 secured to the exterior surface 100 of the vehicle making use of the two threaded holes 104, 106 in the vehicle. The base surface 70 is positioned face-to-face with the exterior surface 100 of the vehicle such that a central axis of the first hole 44 is aligned with a central axis of the first threaded hole 104 in the exterior surface 100 and a central axis of the second hole 46 is aligned with a central axis of the second threaded hole 106 in the exterior surface 100.

The first and second screws 50, 52 are extended into the first and second holes 44, 46, respectively, to engage the threads of the first and second threaded holes 104, 106. As the first and second screws 50, 52 are tightened, the heads of the screws 50, 52 press the lock washers 51, 53 against the respective shoulders 78. Further tightening of the screws 50, 52 may compress the compressible material 91 between the exterior surface 100 of the vehicle and the base surface 70 of the solid body 40. Accordingly, the side mirror bracket 40 is shown in an installed position where it may remain since it will not interfere with opening, closing, removal and installation of the door (see door 12 in FIG. 1A). Alternatively, the side mirror bracket 40 may be removed by reversing the steps described.

Notice that the screws 50, 52 used to secure the solid body 42 in FIG. 5B are longer than the screws 24, 26 that fill the holes 104, 106 in FIG. 5A. Accordingly, the installation kit 90 in FIG. 4 may include the longer screws 50, 52 needed for installation of the solid body 42. Furthermore, the side mirror bracket 40 is shown securing the optional screw plug 94 in the third hole 48.

Figure 5C:
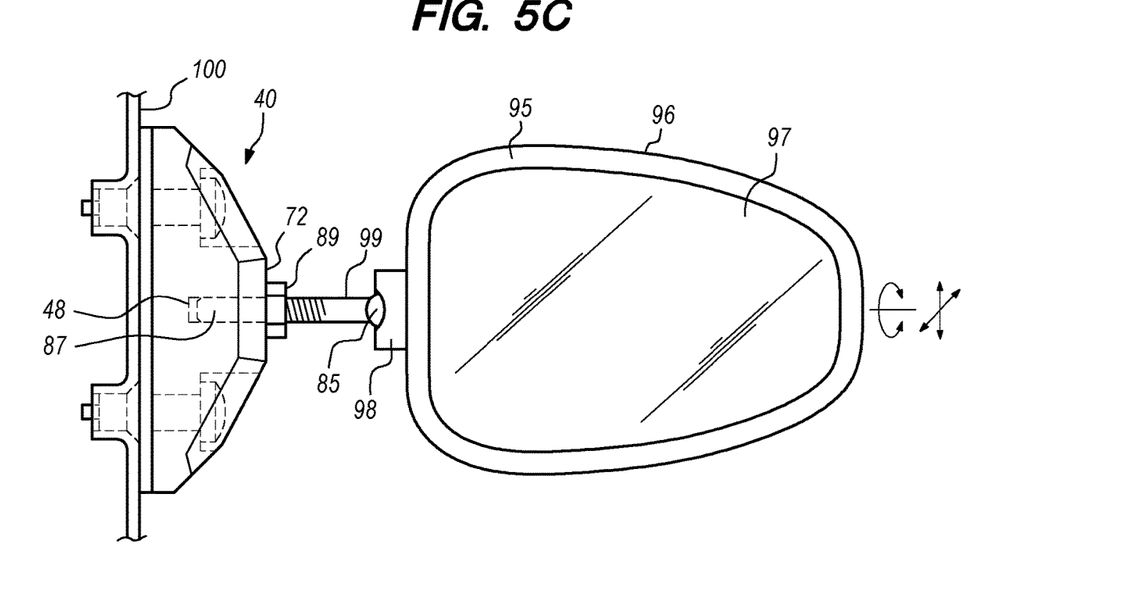
FIG. 5C is a side view of a side mirror secured to the side mirror bracket that has been secured to the vehicle.

FIG. 5C is a side view of a side mirror 96 secured to the side mirror bracket 40, which has been secured to the exterior surface 100 of the vehicle as discussed in reference to FIG. 5B. However, the screw plug 94 has been removed and the threads 87 of the post 99 have been threaded into the threaded third hole 48. When the post 99 of the side mirror 96 has been threaded a secure distance into the third hole 48, the lock nut 89 may be tightened down against the top surface 72 to hold the post firming in position without rotating or backing out. A desired angle of the side mirror 96 may be user-selected to facilitate a view of traffic along a side of the vehicle as viewed in the reflective mirror 97 from the user's seated position within the vehicle. Manual adjustment of the angle of the side mirror 96 may include pivoting the mirror frame 95 and attached socket 98 relative to the ball 85 of the post 99. The mirror angle may be adjusted about the ball 85 in any manner, including rotation about the axis of the post 99 and pivoting up/down and back/forth.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. An apparatus for securing a side mirror to a vehicle, comprising:
    a solid body having a base surface and a top surface, wherein the base surface has a contour that is complementary to a contour of an exterior surface of the vehicle;
    first and second holes through the solid body from the base surface to the top surface, wherein positioning the base surface face-to-face with the exterior surface of the vehicle enables a central axis of the first hole to be aligned with a central axis of a first threaded hole in the vehicle and enables a central axis of the second hole to be aligned with a central axis of a second threaded hole in the vehicle, and wherein each of the first and second holes has a counterbore that opens to the top surface of the rigid body; and
    a third hole that opens to the top surface in an area between the counterbores of the first and second holes, wherein the third hole is threaded to receive a threaded screw that attaches a mirror, and wherein the threaded screw is a threaded end of an arm that extends laterally to secure a mirror.

2. The apparatus of claim 1, wherein the threaded hole in the top surface is a blind threaded hole that does not open to the base surface.

3. The apparatus of claim 1, wherein the solid body has a side-to-side width that is less than a distance between the central axis of the first hole and the central axis of the second hole.

4. The apparatus of claim 1, wherein the solid body has a total thickness between the base surface and the top surface that is less than or equal to 40 millimeters and a beveled edge between the top surface and first and second sides of the solid body so that the solid body may be securely attached to the vehicle and avoid interference with opening of a door to the vehicle that is hinged to the vehicle.

5. The apparatus of claim 4, wherein the solid body has a total thickness between the base surface and the top surface that is less than or equal to 30 millimeters.

6. The apparatus of claim 4, wherein the solid body is securely and removably attachable to the vehicle and avoids interfering with detachment of the door from the vehicle.

7. The apparatus of claim 1, wherein the base surface has a shape of a rectangle with truncated corners.

8. The apparatus of claim 1, wherein the solid body has a first end, a second end, a first side and a second side, and wherein the solid body is symmetrical from side-to-side and symmetrical from end-to-end.

9. The apparatus of claim 1, wherein the third hole has a central axis that is parallel to the central axis of the first hole and the central axis of the second hole, and wherein the third hole is positioned half way between the central axis of the first hole and the central axis of the second hole.

10. A kit for securing a side mirror to a vehicle, comprising:
    a solid body having a base surface, a top surface, first and second holes through the solid body from the base surface to the top surface, and a third hole that opens to the top surface wherein the base surface has a contour that is complementary to a contour of an exterior surface of the vehicle, wherein positioning the base surface face-to-face with the exterior surface of the vehicle enables a central axis of the first hole to be aligned with a central axis of a first threaded hole in the vehicle and enables a central axis of the second hole to be aligned with a central axis of a second threaded hole in the vehicle, wherein each of the first and second holes has a counterbore that opens to the top surface of the rigid body, wherein the third hole opens to the top surface in an area between the counterbores of the first and second holes, and wherein the third hole is threaded to receive a threaded screw that attaches a mirror;
    a side mirror having a post, wherein the post has a distal end that is threaded for threadably connecting to the third hole; and
    first and second screws each having a threaded shaft and a head, wherein the threaded shaft of either of the first and second screws is insertable into either of the first and second holes until the head of the screw is received within the counterbore, and wherein the first and second screws are sized for threadably securing to the first and second threaded holes in the vehicle.

11. The kit of claim 10, further comprising:
    a plug securable to the third hole for protecting the threads of the third hole in the absence of an attached mirror.

12. The kit of claim 11, wherein the plug is a threaded screw plug that is threadably securable with the threads of the third hole.

13. The kit of claim 10, further comprising:
    a compressible pad that is shaped to cover the base surface, wherein the compressible pad has first and second holes positioned to be aligned with the first and second holes through the solid body when the compressible pad is positioned to cover the base surface.

14. The kit of claim 13, wherein the compressible pad has an adhesive layer and a disposable backing sheet covering the adhesive layer, wherein the disposable backing sheet is removable to facilitate adhering the compressible pad to the base surface.

15. The kit of claim 14, wherein the compressible pad is felt.

16. The kit of claim 10, wherein the side mirror includes a swivel joint coupled to the post for manually adjusting an angle between the side mirror and the post.

17. The kit of claim 10, further comprising:
    a second unit of the solid body; and
    a second set of the first and second screws for threadably securing the second unit of the solid body to a second pair of threaded holes in the vehicle.

18. The kit of claim 17, further comprising:
    a second side mirror having a post, wherein the post has a distal end that is threaded for threadably connecting to the third hole in the second unit of the solid body.

19. The kit of claim 17, further comprising:
    a second plug securable to the third hole in the second unit of the solid body for protecting the threads of the third hole in the second unit of the solid body in the absence of an attached mirror.

20. The kit of claim 19, wherein the second plug is a threaded screw plug that is threadably securable with the threads of the third hole in the second unit of the solid body.

* * * * *